Aug. 2, 1966        L. W. SCHULZ        3,263,261
NON-GLARE COVER FOR WINDSHIELD WIPER ARM
Filed Oct. 15, 1965
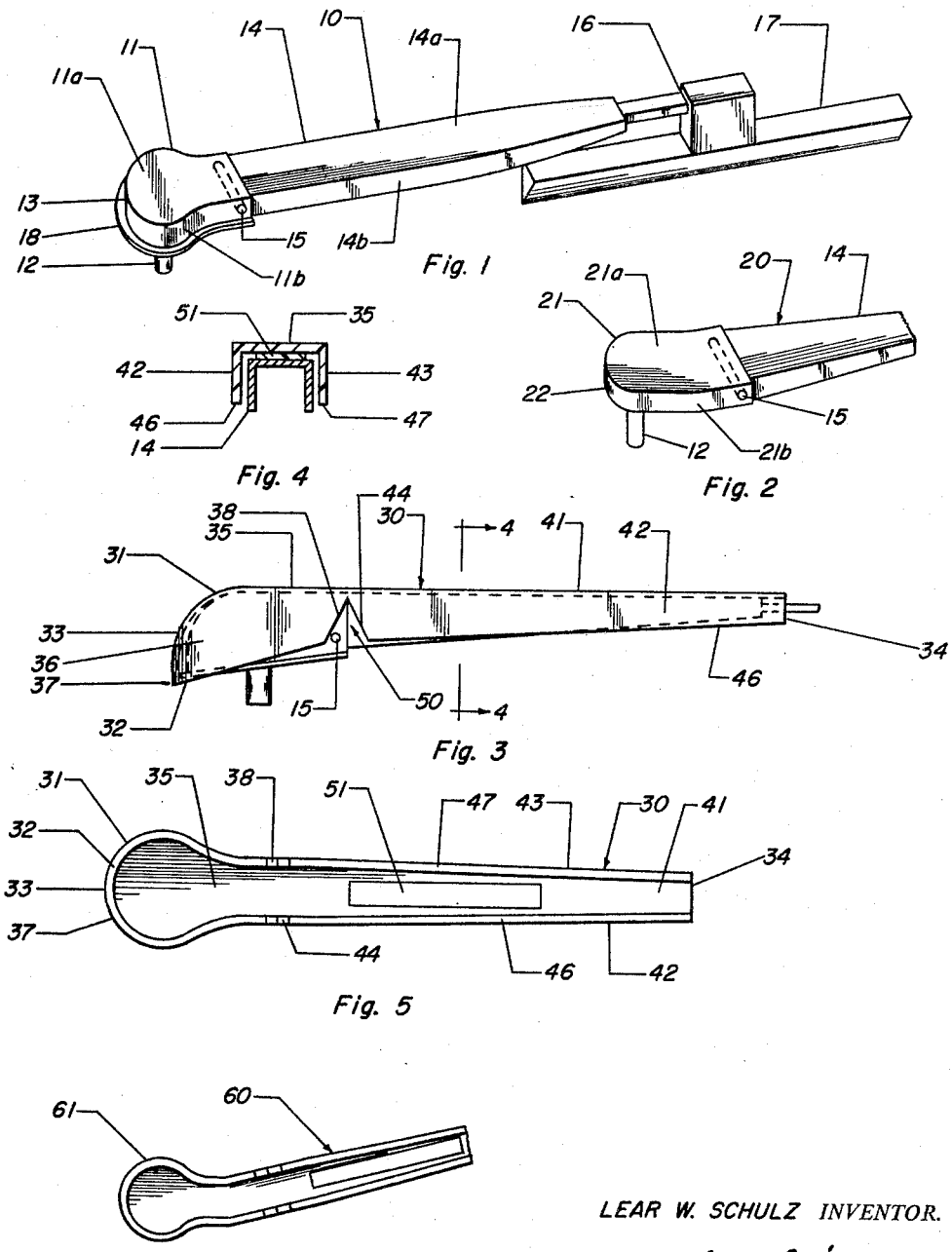
LEAR W. SCHULZ INVENTOR.
BY George R. Nimmer
ATTORNEY

# United States Patent Office 3,263,261
Patented August 2, 1966

3,263,261
NON-GLARE COVER FOR WINDSHIELD
WIPER ARM
Lear W. Schulz, Omaha, Nebr., assignor of forty percent to George R. Nimmer, Omaha, Nebr.
Filed Oct. 15, 1965, Ser. No. 496,642
3 Claims. (Cl. 15—250.35)

This invention relates to a non-glare cover or shield for a windshield wiper arm and in particular relates to a non-glare shield that is adapted for secure engagement to the outwardly exposed light-reflecting surfaces of a dual-section pivot-type windshield wiper arm.

Windshield wiper arms currently manufactured and installed on automobiles and other vehicles are generally made of highly polished bright metal parts. These parts may be bright nickel or chrome plated or may be bright stainless steel. It has been found in practice that such windshield wiper arms installed on a vehicle often reflect glaring beams of sunlight or light from approaching cars into the eyes of a driver of the vehicle. This creates a very serious safety hazard, since the driver can be momentarily blinded by the glare. The usual sun visors provided in automobiles do not shield against this glare. Since two windshield wiper assemblies are customarily installed on a vehicle, two sources of glare exist in all positions of the wiper arms whether in use or not.

The prevalent types of windshield wiper assemblies comprise a dual-section elongate arm having a rearward section that is pivotably mounted to the automobile with a driven torsion rod. The arm also includes an elongate forward section, the rearward portion of which is pivotably attached to the forward end of the rearward section. Carried at the free forward end of the forward section is a wiper blade. The pivotal relationship between the forward section and the rearward section is essential because it permits the wiper blade to be readily adjusted or replaced when worn, and to allow a service station attendant to bendably lift the arm for cleaning the windshield under the wiper blade. Further, there is normally an interior spring mechanism adjacent to pin 15 so that the windshield wiper arm will automatically pivot to a degree in accordance with the contour of a curved windshield.

There are in the prior art non-glare covers for windshield wiper arms, said prior art covers having an inverted elongate trough configuration including a roof member, a pair of opposed upright side members, a closed rearward end, and a pair of convergent elongate interior flanges along the lower elongate extremities of the opposed upright members for engaging the lower or unexthe arm. It has been found that the sheath-like structures are sheath-like in character since they do include inwardly extending flanges for embracing the lower surfaces of the arm. It has been found that the sheath-like structure of the prior art will not remain securely positioned on the arm, especially when the arm sections are subjected to normal pivotal movement. Under flexure conditions of the arm, the sheath-like structure tends to buckle and pucker, particularly at the upright panels and at the rearward panel, so that the cover becomes readily disengaged from the arm.

It is accordingly an object of the present invention to provide a non-glare cover for a windshield wiper arm that may be readily securely engaged to the arm without reliance upon inwardly-extending convergent flanges.

It is another object of the present invention to provide a unitary non-glare shield or cover that is especially well adapted for secure engagement to a dual-section pivotal windshield wiper arm.

It is another object to provide a configuration for a unitary non-glare shield whereby a single dimensional size is adapted for conformable attachment to a variety of sizes of windshield wiper arms.

It is another object to provide a non-glare shield that is resistant to disengagement from the windshield wiper arm by the elements including ice, snow, wind, and rain.

These and other objects and advantages are attained by means of a dual-segment elongate cap-like mantle, each segment having upright members and said two segments being attached together with an elongate flexible roof; the respective segments overlie respective sections of the elongate arm and the forward segment is adhesively attached to the arm forward section, thus inducing a flexed condition in the roof member at the juncture of the two segments.

In the drawing, wherein like numbers refer to like parts in the several views and in which:

FIGURE 1 is a perspective view of a very common type of automobile windshield wiper assembly comprising an elongate swinging arm and a wiper blade.

FIGURE 2 is a detail perspective view of the swinging arm portion of another type automobile windshield wiper assembly.

FIGURE 3 is a side elevational view of one form of the non-glare cover for a windshield wiper arm of the present invention, shown in position on a FIGURE 1 type windshield wiper arm.

FIGURE 4 is a sectional elevational view of the non-glare cover for a windshield wiper arm of FIGURE 3, taken along line 4—4.

FIGURE 5 is a bottom plan view of the non-glare cover of FIGURE 3, shown in its originally formed state prior to attachment upon a windshield wiper arm.

FIGURE 6 is in bottom plan view of an alternate type of non-glare cover that is appropriate to the FIGURE 2 type windshield wiper arm.

That common type of automobile windshield wiper shown in FIGURE 1 comprises a dual-section elongate arm 10 having a rearward section 11 that is pivotably mounted to the automobile near the base of the windshield with a driven torsion rod 12. Rearward section 11 has a butt end 13 at the rearward extremity. Rearward section 14, the rearward portion of which is pivot-lower portion 18. Arm 10 also includes an elongate forward section 14, the rearward portion of which is pivotably connected to the forward end of rearward section 11 with a pivot pin 15. Generally circular rearward section 11 is of shorter length and broader than forward section 14, and elongate bar forward section 14 tapers or narrows in breadth and height from its rearward end to its free forward end 16. Carried at the free forward end 16 of arm forward section 14 is a wiper blade 17. Thus, as powered torque rod 12 is intermittently driven in alternate directions about its longitudinal axis, dual-section arm 10 oscillates from side to side, and the wiper blade 17 in normal operation sweeps over the surface of the windshield (not shown) to wipe water, ice, and snow therefrom. Since the above windshield wiper assembly and its operation is entirely conventional, further description of such structure is believed unnecessary herein for disclosing the present invention.

The alternate type of windshield wiper arm 20 as shown in FIGURE 2 has the elongate bar forward section 14 and an angular rearward section 21 including a butt end rearward extremity 22. Forward section 14 is pivotably connected to rearward section 21 with pivot pin 15 as in the FIGURE 1 embodiment. Rearward section 21 is pivotably mounted to the automobile near the base of the windshield with a driven torque rod 12, and arm 20 operates in an equivalent manner to arm 10.

Both the FIGURES 1 and 2 type windshield wiper arm have light-reflecting outward surfaces including the upper surfaces 11a and 14a on the rearward and forward sections, respectively, the sideward surfaces 11b and 14b on the rearward and forward sections, respectively, and the butt end 13 on the rearward section. Flanged portion 18 is also a light-reflecting outward surface. Similarly, rearward section embodiment 21 has light-reflecting outward surfaces including upper surface 21a, sideward surface 21b, and butt end 22.

The more common type dual-section arm is embodiment 10 shown in FIGURE 1, and the non-glare cover 30 appropriate thereto is shown in FIGURES 3–5. The non-glare cover 30 comprises a non-reflecting light-absorbing dual-segment cap-like mantle, the respective segments being flexibly attached in unitary relationship. The dual-segment mantle is of inverted elongate trough configuration having a closed rearward end 33 that overlies butt end 13 and an open forward end 34. The cap-like mantle has an elongate flexible roof panel 35 formed of a structurally-continuous elastic resinous material, said continuous roof panel overlying the upper surfaces 11a and 14a of the wiper arm 10 and extending from butt end 13, past pivotal connection 15, and extending toward wiper blade 17. The roof panel rearward portion, which overlies upper surface 11a and is of similarly broad shape, is wider and shorter than its forward portion which tapers or narrows toward wiper blade 17 and which overlies upper surface 14a.

Roof panel 35 has a curvilinear upright panel 36 integrally attached thereto adjacent butt end 13 to provide the rearward segment 31 in overlying juxtaposition with the light-reflecting outward surfaces of the arm rearward section 11. Specifically, panel 36 overlies surfaces 11b, 13, and 18. The forward end 38 of rearward segment 31 slopes linearly and upwardly from the lower elongate edge 32 thereof and terminates at the inner surface of roof panel 35. The inter-section of forward end 38 with roof panel 35 is preferably immediately above pivot pin 15. Lower edge 32 of rearward segment 31 slopes upwardly from lower rearward extremity 37 toward a forward end 38. As shown in FIGURE 3, it is not necessary that the lower elongate edge 32 extend below or even be flush with the lower extremity of side surface 11b, just so the major portion of surface 11b is covered. The inward surface of curvilinear upright panel 36 is free of inwardly-extending protrusions and specifically the lower edge 32 is free of inwardly-extending flanges at the under surface of arm rearward section 11. Moreover, panel 36 is thinnest at edge 32 to better accommodate an outward flange 18, if there be one.

There is a pair of opposed lateral panels 42 and 43 integrally connected to opposite elongate edges of roof panel 35 near to mantle forward open end 34, said lateral panels 42 and 43 and coextensive transverse portions of intervening roof panel 35 providing the forward segment 41 of the mantle. The forward extremities of opposed lateral panels 42 and 43 are spaced apart a finite distance to provide the forward open end 34. Lateral panels 42 and 43 overlie the light-reflecting opposed sideward surfaces 14b of arm forward section 14. The lower elongate edges 46 and 47 of panels 42 and 43, respectively, are mutually parallel and slope downwardly from open end 34 so that the rearward end 44 of said panels is wider than forward end 34. The inward surface of lateral panels 42 and 43 are planar and free of inwardly extending protrusions; specifically, the lower elongate edges 46 and 47 are free of inwardly extending flanges. As shown in FIGURE 3, it is not necessary that the lower extremities 46 and 47 be flush with the lower extremity of side surface 14b, just so the surface 14b is substantially covered thereby. It is noted that the vertical height of rearward segment 31 is greater than that of forward segment 41.

The rearward end 44 of forward segment 41 slopes linearly upwardly from lower elongate edges 46 and 47 and terminates at the inner surface of roof panel 35 immediately above pivot pin 15. Rearward end 44 and forward end 38 intersect at the inner surface of roof 35, their intersection providing the apex of a notch-like gap boundary 50 between segments 31 and 41. Pivot pin 15 is located within notch-like boundary 50.

As non-glare shield 30 is in position over wiper arm 10, there is some flexure stress within roof panel 35 at the apex of gap boundary 50. As illustrated in FIGURE 5, as non-glare shield 30 is originally molded of a resinous material, the forward boundary 38 and the rearward boundary 44 of gap 50 are closer together and more nearly parallel than in the FIGURE 3 attached form, and are in fact nearly touching one another in this pre-attached form. As originally molded, the lower edges 32 and 46 of the respective segments are non-parallel and oblique with respect to each other.

As can best be seen in FIGURES 4 and 5, the attachment between non-glare shield 30 and wiper arm 10 is by means of an adhesive layer 51 on the inner surface of roof panel 35 within forward segment 41. In this manner, roof panel 35 is adhesively attached to upper surface 14a of arm forward section 14. In commercial use, the adhesive layer 51 is provided with a releasable protective layer (not shown). When shield 30 is attached in this manner, the rearward segment 31 having elastic memory tends to reassume its molded state and bears toward arm rearward section 11, there being unrelieved flexure stress in roof 35 at the apex of gap 50.

In order to provide a non-glare shield that will function with the bent rearward section 21 of arm 20, it is only necessary to change the cross-sectional shape of the shield rearward segment in accordance therewith. As shown with the glare shield 60 of FIGURE 6, the contour of its rearward segment 61 is slightly different than that of rearward segment 31 in order to match the contour of arm rearward section 21. In all other respects non-glare shield 60 is in all respects identical to that of shield 30.

While I have illustrated and described two embodiments of my invention, it is to be understood that I do not limit myself to the precise constructions herein disclosed and that various changes and modifications may be made within the scope of the invention as defined in the appended claims.

I claim:

1. A non-glare cover for a windshield wiper arm, said arm having a shorter and wider rearward section and a longer and narrower forward section pivotably attached to the arm rearward section, said non-glare cover comprising a non-reflecting light-absorbing unitary dual-segment cap-like mantle of inverted trough configuration, said mantle having a rearward end and an open forward end, said cap-like mantle comprising:

(A) An elongate flexible roof panel formed of a structurally-continuous elastic resinous material, said roof panel being transversely wider at the mantle rearward end than at the forward end, (B) A pair of upright opposed lateral panels, each of said lateral panels being integrally attached to opposite elongate edges of the roof panel nearer to the roof panel forward end, said lateral panels and coextensive portions of the intervening roof panel providing the forward segment of the mantle, the forward extremities of the lateral panels being spaced apart a finite distance to provide a forward open end for the mantle, the inward surface of the respective lateral panels along the lower elongate extremity being free of inwardly-extending flange-like protrusions, the rearward extremities of the lateral panels terminating at the roof panel interior surface, the interior surface of the mantle forward segment having a layer of adhesive material for attachment of said mantle to the windshield wiper arm forward section, and (C) At least one upright panel integrally attached to the roof panel rearward portion to provide a rearward segment adapted to cover light-reflecting outward surfaces of the arm rearward section, the forward extremity of the rearward segment terminating at the roof panel interior surface to provide in conjunction with the forward segment rearward extremities a notch-like boundary between the two segments, the apex of said notch-like boundary being at the roof panel interior surface.

2. A non-glare cover for a windshield wiper arm of the type having a shorter and wider rearward section and a longer and narrower forward section pivotably attached to the arm rearward section, said non-glare cover comprising a non-reflecting light-absorbing unitary dual-segment mantle of inverted trough configuration, said mantle having a closed rearward end and an open forward end, said mantle comprising:

(A) An elongate flexible roof panel formed of a structurally-continuous elastic resinous material, said roof panel being wider at the mantle rearward end than at the forward end, (B) A pair of upright opposed lateral panels, each of said lateral panels being integrally attached to opposite elongate edges of the roof panel at the roof panel forward end, said lateral panels and coextensive portions of the intervening roof panel providing the forward segment of the mantle, the forward extremities of the lateral panels being spaced apart a finite distance to provide a forward open end for the mantle, the lower elongate extremity remote of the roof panel of each lateral panel being linear and mutually parallel, the height of said lateral panels being greater at the rearward extremity than at the forward extremity, the inward surface of the respective lateral panels along the lower elongate extremity being linearly generated and free of inwardly extending flange-like protrusions; the rearward extremities of the lateral panels sloping upwardly from the lower elongate extremity thereof toward the roof panel, and the interior surface of the roof panel within the forward segment having a layer of adhesive material for attachment of said mantle to the windshield wiper arm forward section; and (C) At least one upright panel integrally attached to edges of the roof panel including at the rearward end thereof to provide a rearward segment adapted to cover the upper surface, sides, and butt end of the windshield wiper arm rearward section, the lower extremity of the rearward segment tapering upwardly from the rearward end to the forward extremity thereof, the inward surface of the rearward segment upright portions being free of inwardly extending protrusions, the forward extremities of the rearward segment upright portions sloping upwardly from the lower extremity thereof toward the roof panel, the forward extremities of the rearward segment and the rearward extremities of the lateral panels intersecting at the interior surface of the roof panel to provide opposed wedge-like gap boundaries between the forward and rearward segments, said wedge-like gaps being spaced substantially equidistant from the mantle forward end, said opposed gap boundaries being nearer to the mantle closed rearward end than to the mantle open forward end.

3. In combination with a windshield wiper having a wiper blade and having a swinging arm whereby the wiper blade is supported for oscillating movement, said arm having a narrower forward section and a wider rearward section including a butt end, said forward and rearward sections having light-reflecting outward surfaces, said forward section being pivotably connected to the rearward section and also pivotably connected to the wiper blade, the combination of a non-glare cover adherently attached to the light-reflecting outward surface of the swinging arm, said non-glare cover comprising a non-reflecting light-absorbing unitary dual-segment cap-like mantle of inverted trough configuration, said mantle having a closed rearward end and an open forward end, said mantle having an elongate flexible roof panel formed of a structurally-continuous elastic resinous material, said roof panel being wider at the rearward end than at the forward end, the rearward portion of the roof panel overlying the swinging arm rearward section having at least one integrally connected upright panel to provide a rearward segment in juxtaposition with the light-reflecting outward surfaces of the arm rearward section; a pair of opposed lateral panels, each of said lateral panels being integrally attached to opposite elongate edges of the roof panel nearer to the roof panel forward end, said opposed lateral panels and coextensive portions of the intervening roof panel providing the forward segment of the mantle, the forward extremities of the lateral panels being spaced apart a finite distance to provide a forward open end for the mantle, the inward elongate surface of the respective lateral panels along the lower elongate extremity being free of inwardly-extending flange like protrusions, said mantle forward segment being in juxtapositions against the light-reflecting outward surfaces of the arm forward section, the interior surface of the roof member being attached to the arm forward section with an intervening layer of adhesive; the lower elongate edges of the rearward and forward segments being oblique with respect to the other, and the forward end of the rearward segment and the rearward end of the forward segment being spaced apart a finite distance to provide a gap-like boundary between said two segments, said boundary overlying the pivotal connection between the arm forward and rearward sections.

References Cited by the Examiner

UNITED STATES PATENTS

| | | | |
|---|---|---|---|
| 3,021,548 | 2/1962 | Stoller | 15—250.36 |
| 3,105,990 | 10/1963 | Harris et al. | 15—250.35 |
| 3,160,906 | 12/1964 | Morena | 15—250.35 |
| 3,199,563 | 8/1965 | Forrest | 15—246 X |

CHARLES A. WILLMUTH, *Primary Examiner.*